Figure 1:
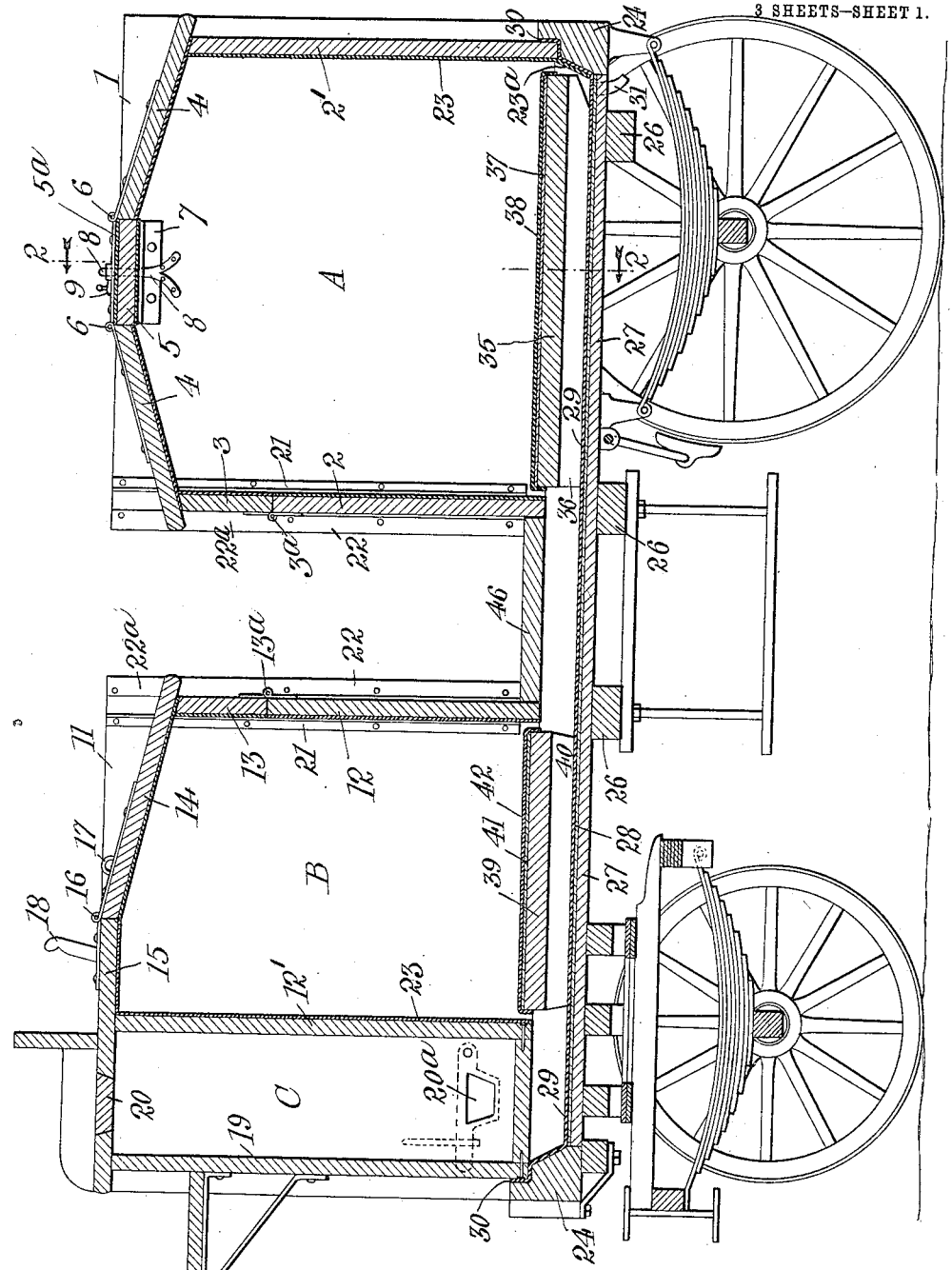

J. C. & J. J. RAUM.
WAGON.
APPLICATION FILED APR. 30, 1912.

1,075,378.

Patented Oct. 14, 1913.

3 SHEETS—SHEET 1.

Witnesses
E. J. Clements
J. F. Baker

Inventors
John C. Raum,
John J. Raum,
by Watson & Boyden, Attorneys

J. C. & J. J. RAUM.
WAGON.
APPLICATION FILED APR. 30, 1912.
1,075,378.
Patented Oct. 14, 1913.
3 SHEETS—SHEET 2.
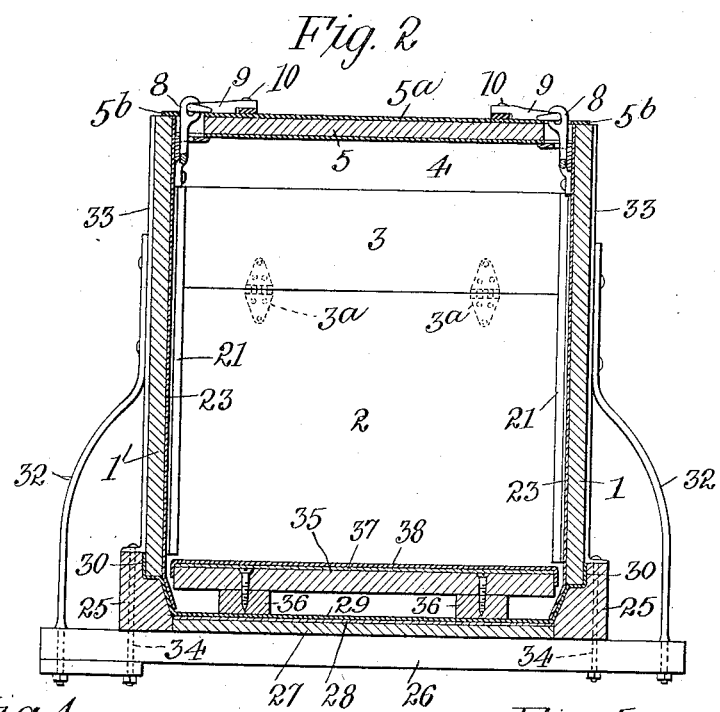
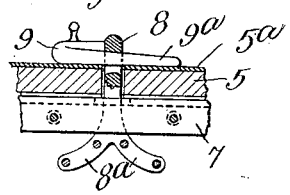
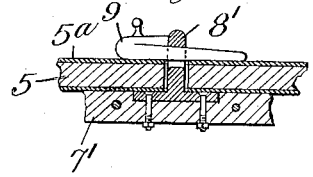
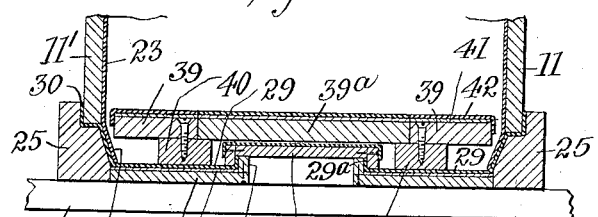
Witnesses
E. J. Clements
G. H. Baker
Inventors
John C. Raum,
John J. Raum,
by Watson & Boyden, Attorneys

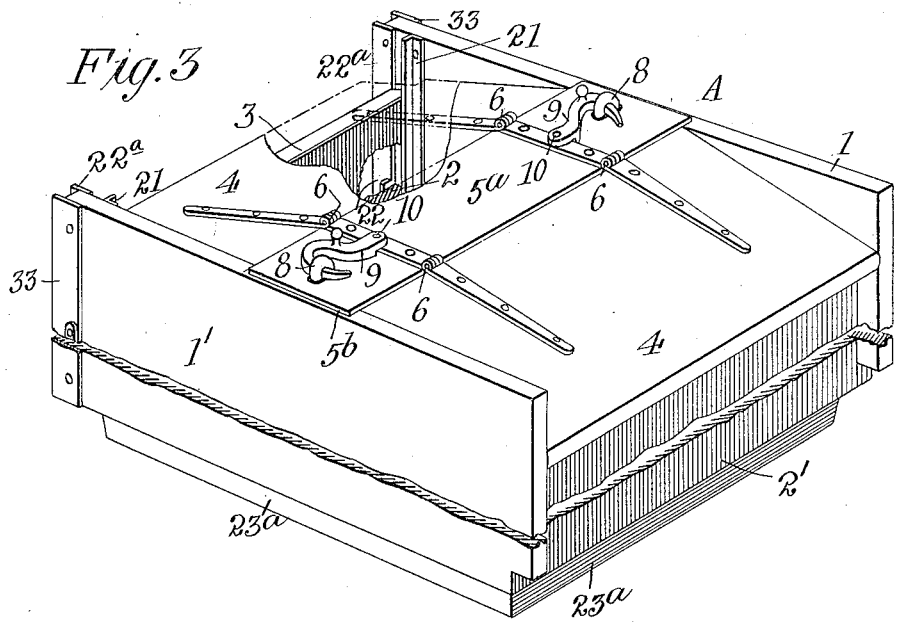
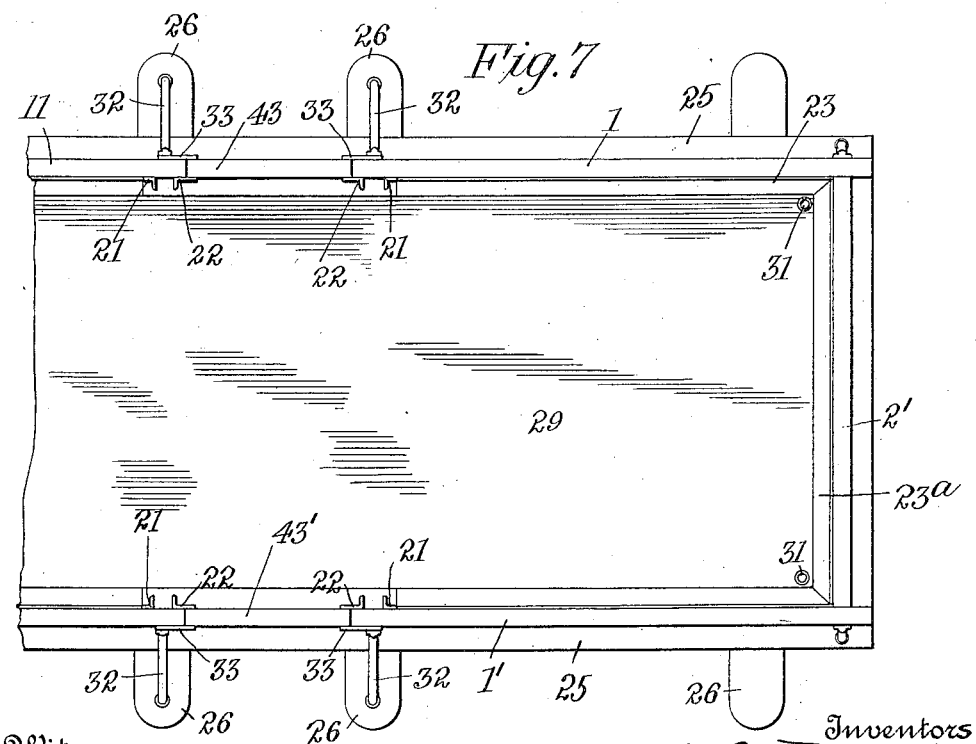

UNITED STATES PATENT OFFICE.

JOHN C. RAUM AND JOHN J. RAUM, OF BALTIMORE, MARYLAND.

WAGON.

1,075,378.

Specification of Letters Patent.

Patented Oct. 14, 1913.

Application filed April 30, 1912. Serial No. 694,116.

*To all whom it may concern:*

Be it known that we, JOHN C. RAUM and JOHN J. RAUM, citizens of the United States, residing at Baltimore, State of Maryland, have invented certain new and useful Improvements in Wagons, of which the following is a specification.

Our invention relates to so called antidrip wagons, used for transporting material from which waste liquid is likely to flow, and more particularly to wagons of the type shown in our prior Patent No. 985,633, dated February 28, 1911. In the construction of this patent it has been found that the bottom of the pan is apt to "sweat". That is to say, the presence of ice and ice water in the pan so cools it as to cause moisture to condense on its lower surface, which moisture eventually falls off in the form of drops and wets the running gear.

It is the object of the present invention to provide means for preventing such condensation.

Another object of the invention is to provide a wagon body structure which may be readily adapted for use either as an ice cream or similar refrigerator wagon or as a wagon for hauling other classes of merchandise. In other words, means are provided for converting the pair of closed compartments used for refrigerating purposes into a single continuous open compartment or body for use in hauling general merchandise.

With the above and other objects in view and to improve generally upon the details of such apparatus the invention consists in the construction and arrangement of parts hereinafter described and claimed and shown in the accompanying drawings in which—

Figure 1 is a central longitudinal section through our improved wagon showing the same adapted for refrigerator purposes; Fig. 2 is a transverse section thereof on the line 2—2 of Fig. 1, looking in the direction of the arrow; Fig. 3 is a perspective view of the rear compartment, parts being broken away; Fig. 4 is a fragmentary detail view of means for detachably connecting the cover plate to the rear compartment; Fig. 5 is a similar view showing a slightly modified construction; Fig. 6 is a fragmentary transverse section through the front part of our improved wagon body showing a construction which may be employed in connection with motor driven trucks; and Fig. 7 is a partial plan view showing our improved body as it appears when arranged for hauling general merchandise.

Referring to the drawings in detail, our improved body, as shown in Fig. 1, comprises the three compartments or sections A, B and C.

The rear compartment A comprises the side walls 1, 1', and the end walls 2, 2'. Hinged to the front wall 2, at 3ª, is a door 3, opening outwardly.

The end walls are of less height than the side walls, and the top of the compartment is closed by means of oppositely inclined doors 4 resting one upon the rear wall 2' and the other upon the top of the door 3. The doors 4 are hinged at 6 to a cover plate or cross bar 5 extending between and supported by the side walls 1. This cross bar 5 preferably is covered and protected by a plate or sheet of metal 5ª, the ends of which extend over and rest upon the side walls as indicated at 5ᵇ in Fig. 3. The cross bar 5 is supported at each end, as shown in Figs. 1 and 4, by means of brackets 7 formed of angle iron, secured to the side walls 1, 1'. In order to secure the cross bar in position eye bolts 8 are provided, each of such bolts being formed with a divided lower end 8ª bolted or otherwise secured to one of the side walls. Such eye bolt extends upwardly through an opening in the flange of the bracket 7 and has its eye opening located above the top of the plate 5ª.

Instead of the construction shown in Fig. 4 the form of eye bolt shown in Fig. 5 may be employed, such bolt comprising a head 8' and an elongated transversely extending base embedded in and bolted to a block 7' secured to the side walls in place of the brackets 7.

Arranged to coöperate with the eye bolts 8 are keys 9 which are shown in the form of hooks pivoted at 10 to the bar 5. Each of these hooks is provided with a tapering or wedge shaped point 9ª (see Fig. 4) adapted to enter the eye of the bolt 8 and to engage the surface of the plate 5ª so as to securely lock the cross bar in position. Other forms of wedge shaped keys or locking devices may be devised without departing from the spirit of the invention. It is evident that by swinging the hooks 9 out of engaging with the eyes 8 the cross bar 5 and attached doors 4 may be bodily lifted from the compartment A.

The front section of our improved body comprises the side walls 11, 11' and rear wall 12, and a partition wall 12' separating the compartments B and C. To the rear wall 12 is hinged, at 13ª, a door 13, similar to the door 3, and also opening outwardly. Between the side walls 11 and 11' extends a fixed cover 15, to which is hinged at 16, an inclined door 14, which rests upon the top of the door 13. A ring 17 may be attached to the door 14 and arranged to engage a hook 18 mounted upon the cover 15, for the purpose of holding the door 14 open, when desired.

The front wall 19 of the section, with the partition wall 12' forms the compartment C, which is adapted to contain salt. Such compartment may be filled through a trap door 20 under the driver's seat, and the contents may be discharged by means of pivoted doors 20ª arranged at each side of the wagon in the manner shown and described in our co-pending application, Serial No. 681,726, filed March 5, 1912.

The inside end walls 2 and 12 and their associated doors 3 and 13 are made removable so that compartments A and B may be converted into one. This may be conveniently accomplished by supporting such walls in guide ways formed by spaced angle irons 21, 22, secured to the inside of the side walls, 1, 1', 11, 11'. In order to permit the doors 3 and 13 to swing outwardly as described, one flange of the angle irons 22 is cut away at the top as indicated at 22ª.

The entire inside surface of both compartments A and B is preferably lined with sheet metal, such as zinc or galvanized iron, as indicated at 23.

The compartments or sections above described are supported by a body frame. This frame comprises the end sills 24 and the side sills 25, rigidly connected, and braced by means of cross sills 26. In our prior patent, above referred to, the pan rests directly upon these cross sills, but in the present construction we provide a wooden floor 27 supported upon the cross sills, and on this floor preferably spread a sheet 28 of paper, asbestos, or other heat insulating material. The pan 29 then rests upon such heat insulating material, and is thereby entirely protected from the air on the outside so that condensation is prevented. As in our prior patent, the pan 29 conforms to the shape of the body frame and its upper edge 30 is flush with the top surface of such frame. A drip spout 31 is provided at a suitable point for discharging the waste liquid. The walls of the body sections rest in grooves formed in the frame and grip the edge 30 of the pan between themselves and the side and end sills. The edge of the sheet metal lining 23 projects down into the pan as indicated at 23ª. The sections are held in place by means of braces 32 and strap bolts 33 as in our prior patent, above referred to, the bolts passing through the side and cross sills as indicated at 34.

Within compartment A is arranged a removable bottom 35 supported on sills 36 which rest directly upon the pan, such bottom being preferably covered with a layer of paper 27 and galvanized iron or the like 38. In the compartment B is arranged a similar removable bottom 39 supported upon sills 40 resting upon the pan 29, and provided with paper and sheet metal coverings 41 and 42, respectively.

Referring to Fig. 7, it will be seen that one flange of the angle irons 22 projects beyond the edge of the corresponding side wall and the edge of the straps 33 also projects beyond such end, such projecting edges forming a groove in which may be inserted gates 43, 43' so as to lie in the plane of the side walls and render such walls continuous. It will therefore be observed that when the cross bar 5 and attached doors are removed, the door 14 swung back and secured in open position, the end walls 2 and 12 and their attached doors withdrawn, and the gates 43, 43' inserted, the compartments A and B are converted into a single continuous open body adapted for hauling any kind of merchandise desired. When used in this manner the removable floors 35 and 39 may be removed, as well as the platform 46 which normally extends between the compartments and is supported by the side sills.

When our improved body is used upon motor driven trucks, it is necessary that some provision be made whereby the driver may readily obtain access to the motor, which is usually located near the front of the vehicle. To this end we provide an opening through the floor of our body, as shown in Fig. 6, and turn up the edges of the pan 29 around such opening, as indicated at 29ª, to prevent the escape of liquid therethrough. Such turned up edges may be supported by means of strips 44 placed around the edge of the opening, and the opening is closed by means of a removable cap 45 having flanges which embrace such strips. Immediately over the cap 45 we provide the floor 39 with a removable section 39ª which is adapted to rest upon the sills 40. By removing the section 39ª and taking off the cap 45 access may be had to the motor from inside of the body.

It will thus be seen that we have provided an improved non-sweating anti-drip wagon, and also a convertible wagon body which can be easily adapted to a number of different uses, and it is thought that the many advantages of our improved construction will be appreciated without further discussion.

What we claim is:—

1. In a vehicle, a frame, a body supported thereby, such body comprising side walls, removable end walls and a cover, said cover comprising a cross bar and a pair of doors hinged thereto and adapted to rest upon said removable end walls, and means for detachably connecting said cross bar directly with the side walls of the body.

2. In a vehicle, a frame, a body supported thereby, and comprising side and end walls, a cross bar extending between said side walls, an eye bolt secured to each side wall and projecting through said cross bar, keys adapted to engage said eye bolts to hold said cross bar in position, and hinged doors secured to said cross bar and constituting a cover for said body.

3. In a vehicle, a body comprising a pair of independent sections spaced apart, each of said sections being made up of side and end walls, the adjacent end walls of said sections being entirely removable, and the side walls of each section lying in the same plane, and removable gates adapted to extend between the corresponding side walls of each section so as to fill the space between them, and thus render the wall at each side continuous, whereby, when said adjacent end walls are removed, and said gates inserted, said body is converted into a single compartment.

4. In a vehicle, a frame, a pair of body sections carried thereby and spaced apart, each of such sections comprising side and end walls, the side walls of each section lying in the same plane, a pair of guide ways formed on the inside of each side wall of each section and adapted to receive the adjacent end walls thereof, another pair of guide ways formed at the adjacent ends of the side walls of each section, and a pair of gates adapted to fit within the last mentioned guide ways of each section so as to form a continuous wall at each side of the body, whereby, when the adjacent end walls are removed, a single continuous body compartment is formed.

In testimony whereof we affix our signatures, in presence of two witnesses.

JOHN C. RAUM.
JOHN J. RAUM.

Witnesses:
 BESSIE C. LOHMULLER,
 JACOB S. BARNES.

---

Copies of this patent may be obtained for five cents each, by addressing the "Commissioner of Patents, Washington, D. C."